(12) United States Patent
Robinson et al.

(10) Patent No.: US 7,914,602 B1
(45) Date of Patent: Mar. 29, 2011

(54) PROCESS TO REDUCE STEEL FURNACE SLAG CARRY-OVER DURING TAPPING

(75) Inventors: Stewart W. Robinson, Lagrange, KY (US); Greg Brasel, Louisville, KY (US)

(73) Assignee: Carbide Industries, LLC, Louisville, KY (US)

( * ) Notice: Subject to any disclaimer, the term of this patent is extended or adjusted under 35 U.S.C. 154(b) by 0 days.

(21) Appl. No.: 12/629,426

(22) Filed: Dec. 2, 2009

(51) Int. Cl.
C21B 13/00 (2006.01)
C22B 7/04 (2006.01)

(52) U.S. Cl. .............................. 75/584; 75/10.46; 65/20
(58) Field of Classification Search ................ 75/10.46, 75/584; 65/20
See application file for complete search history.

(56) References Cited

U.S. PATENT DOCUMENTS

| | | | |
|---|---|---|---|
| 3,126,274 A | 3/1964 | Aamot | |
| 3,999,979 A | 12/1976 | Outhwaite et al. | |
| 4,431,169 A | 2/1984 | Fuzii et al. | |
| 4,478,392 A | 10/1984 | Fuzii | |
| 5,279,639 A * | 1/1994 | Kemeny et al. | 75/309 |
| 6,074,598 A * | 6/2000 | Koffron et al. | 266/45 |
| 6,267,798 B1 | 7/2001 | Kemeny et al. | |
| 6,544,314 B2 | 4/2003 | Stendera et al. | |
| 6,602,069 B2 | 8/2003 | Purchase | |
| 6,793,708 B1 | 9/2004 | Jones et al. | |
| 6,875,251 B2 | 4/2005 | Gordon et al. | |
| 2006/0065071 A1 | 3/2006 | Fleischanderl et al. | |
| 2007/0084306 A1 | 4/2007 | Jones | |
| 2007/0266824 A1 | 11/2007 | Stein et al. | |
| 2009/0114063 A1 | 5/2009 | Kunze et al. | |

OTHER PUBLICATIONS

CRC Handbook of Chemisty and PhysicsWeb Edition, $91^{st}$ edition, 2010-2011.*

Zhang, L., Thomas, B., State of the Art in Evaluation and Control of Steel Cleanliness, ISIJ International, vol. 43 (2003), No. 3, pp. 271-291.

* cited by examiner

Primary Examiner — George Wyszomierski
Assistant Examiner — Tima M McGuthry-Banks
(74) Attorney, Agent, or Firm — Woodard, Emhardt, Moriarty, McNett & Henry LLP

(57) ABSTRACT

A process for tapping a steel furnace with a reduced amount of entrained slag is disclosed. During tapping, particles of a slag foaming agent are added. The foaming agent may include calcium carbide and/or other chemicals. The agent foams the slag to decrease its density during tapping and/or to disrupt initial vortex formation at the tap.

27 Claims, 4 Drawing Sheets

PROCESS TO REDUCE STEEL FURNACE SLAG CARRY-OVER DURING TAPPING

FIELD OF INVENTION

The present invention is in the field of steel making, and more particularly in the field of tapping steel from a steel-making furnace.

BACKGROUND

The present invention is an improvement on tapping steel from a steel making furnace with a reduced amount of slag passing through the taphole. After charging the furnace and heating, molten steel is drained, from a steel making furnace by tapping the furnace. The molten steel is typically tapped into a ladle positioned below the furnace taphole. In the furnace after heating, slag, typically molten, floats on top of the molten steel. The slag typically has chemical components and other impurities which, for quality control purposes of the steel, it is desirable to exclude from the downstream processing of the steel product. Such slag can be carried over in the flow of this steel during tapping, drawing slag and its impurities down through the taphole into the steel ladle or other receptacle. It is desirable to prevent, or at least minimize, such slag carry over during tapping. Vortex formation and slag carry over has been addressed in the past by the use of stopping the tapping process early (using electronic or other slag detection systems), post-tap skimming of the steel ladle slag, the use of slag darts or balls in the furnace taphole, and/or by the original design of a furnace, such as by having a furnace designed and constructed with an eccentric taphole to delay vortex formation. The present invention prevents, or at least reduces, slag carry over during tapping in a new and non-obvious way, and optionally also can have other beneficial effects.

SUMMARY

The claims, and only the claims, define the invention. The present invention may include a process for reducing the mass of furnace slag exiting a taphole during tapping a steel making furnace, comprising the acts of charging a steel making furnace, heating the contents of said furnace to form molten steel and slag on top of said steel, tapping said furnace to drain said molten steel from said furnace, and during said act of tapping, adding a foaming agent in said furnace to form slag foam, wherein said foaming agent foams said slag providing for a reduction of slag mass from exiting said taphole. In some cases the foaming agent may include calcium carbide and/or may comprise particulate smaller than the taphole.

The present invention provides an improved process to reduce steel furnace slag carry over during tapping. These and other benefits are set forth in this written description in more detail.

BRIEF DESCRIPTION OF THE PREFERRED EMBODIMENTS

Figure 1:
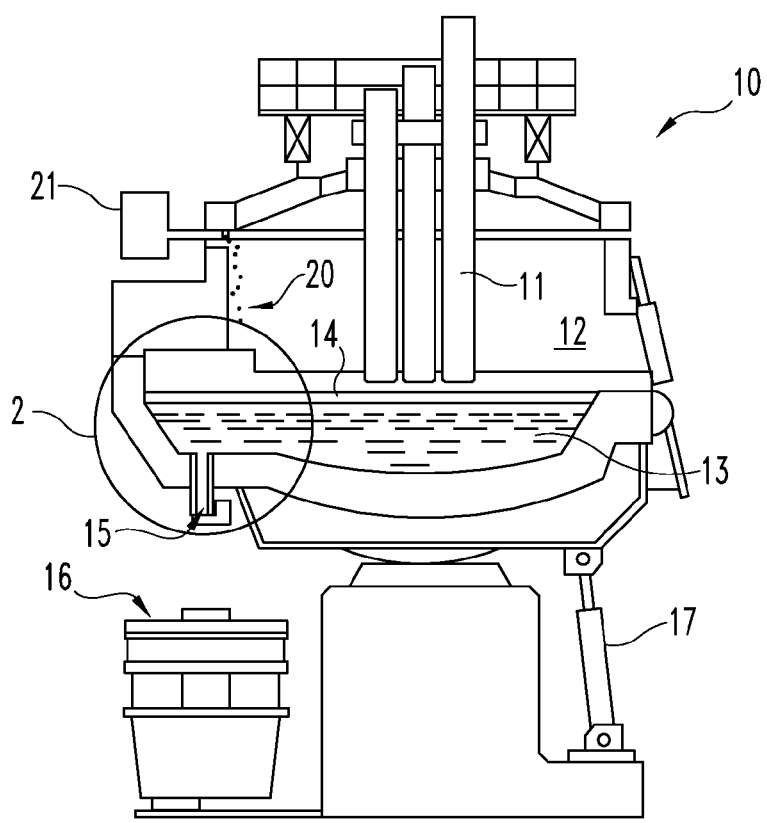
FIG. 1 is a side cross-sectional diagram of an electric arc steel making furnace.

For the purposes of promoting an understanding of the principles of the invention, reference will now be made to the examples, sometimes referred to as embodiments, illustrated and/or described herein. Those are mere examples. It will nevertheless be understood that no limitation of the scope of the invention is thereby intended. Such alterations and further modifications in the described processes, systems or devices, any further applications of the principles of the invention as described herein, are contemplated as would normally occur to one skilled in the art to which the invention relates, now and/or in the future in light of this document.

As used in the claims and the specification, the following terms have the following definitions:

The term "alloy" means a metal matrix of two or more different metals melted together.

The term "calcium carbide" means that which is or includes the compound $CaC_2$.

The term "charging" means the adding of ingredients to the furnace. This may include, but is not limited to, scrap steel, pig iron, lime, dolomitic lime, magnesite, coke, calcium carbide and/or otherwise.

The term "density" means mass per unit volume.

The term "disrupts" means to physically, chemically or otherwise interrupt or redirect flow magnitude and/or flow direction.

The term "drain" means to allow a fluid to flow through an opening.

The term "exothermic" means a chemical reaction that releases heat energy.

The term "endothermic" means a chemical reaction that absorbs heat energy.

The term "foaming agent" means an additive of chemical or chemicals which react with the steel and/or slag to liberate gas into slag. This can include carbon (which is endothermic in steel), limestone, other metal carbonates, SiC, calcium carbide and/or otherwise, alone and/or in combination The term "foaming assistor" means a chemical or chemical compound, or mixture or blend thereof, added to slag, such as particulates that when suspended in the slag can stabilize foam, and/or the addition of agents that modify the surface tension forces and/or viscosity in the slag. This may include, but is not limited to magnesia-wustite (mixtures of magnesium oxide and iron oxide), calcium oxide-silica, iron oxide, and otherwise, alone and/or combined. They may be included and/or not included in a foaming agent.

The term "foams" means the liberation of gas in a liquid to create foam.

The term "gaseous slag foam" means liquid slag having numerous gas bubbles dispersed therein, at least temporarily, resulting in a reduced density.

The term "initial vortex formation" means the early stages of vortex formation in a fluid including the first forming a swirling depression above a taphole or drain.

The term "multiple" means more than two.

The term "near" means close enough, relative to head depth and flow, so as to substantially affect another parameter or phenomenon.

The term "particles" mean discrete solid pieces. They may be spherical or non-spherical, smooth or jagged, the same size and/or different size as other particles, the same material and/or different materials and/or blends and/or combinations thereof, and may also be and/or include granules and/or dust. Particles may be any size, but preferably range from an outermost diameter dimension for a given particle of about #12 U.S. mesh, or even $1/8^{th}$ inch, or even ¼ inch, up to about 1 to 1½ inch, although they may be larger or smaller.

The term "slag" means the non-steel by-product in a steel making furnace, typically present as a molten liquid floating on top of the steel. It frequently may comprise and/or may be a mixture of metal oxides, metal sulfides, calcium oxide, magnesium oxide, magnesite, iron oxide, manganese oxide, silica, sulfur, phosphorus, and/or otherwise, as well as combinations thereof.

The term "slag additive" means any matter added to and which in whole or in part dissolves in and/or reacts with slag, and an includes without limitation: foaming agents, foaming assistors, slag conditioners, gases (e.g. argon), others metals, and/or compounds thereof.

The term "slag conditioner" means a chemical or chemical compound, or mixture or blend thereof, added to a molten steel and/or slag to reduce its oxygen potential and/or modify its chemistry to one more suitable for the process, or both.

The term "entrained slag" means slag that is carried with the steel through the taphole.

The term "retained slag" means that portion of the slag remaining in the furnace after the tapping process.

The term "slag density" means the mass per unit volume of a slag.

The term "slag on top of said steel" means liquid, solid and/or foamed slag floating above liquid steel.

The term "smaller than said taphole" means that the largest diameter of something (e.g., a particle) that is less than the smallest internal cross-sectional diameter across the taphole.

The term "steel desulfurizing agent" means an additive which chemically reacts with sulfur in molten steel to extract or precipitate sulfur, and/or a slag conditioner which facilitates removal of sulfur from steel.

The term "steel making furnace" means a furnace used for making steel therein, and includes but is not limited to, a primary and/or secondary steel making furnaces (including but not limited to basic oxygen furnaces, electric arc furnaces, ladle metallurgical furnaces, induction furnaces, and the like).

The term "sustained" means for a period of time, typically in excess of several seconds.

The term "taphole" means a hole, typically at or near the bottom of a steel making furnace, through which steel is drained, primarily by gravity, from the steel making furnace into a ladle and/or other conduit or vessel. While this may vary, typical tapholes may often be about 6 to 9 inches inside round diameter. However, these tapholes tend to grow larger with wear, and thus here pertains to the taphole size during a given process.

The terms "tap" and "tapping" mean the process of opening the furnace taphole and draining at least the molten steel from the furnace.

The term "vortex formation" means taking the form of a vortex in a liquid being drained through a taphole (typically emulating a cyclone shape).

Articles and phases such as, "the", "a", "an", "at least one", and "a first", are not limited to mean only one, but rather are inclusive and open ended to also include, optionally, two or more of such elements.

The language used in the claims is to only have its plain and ordinary meaning, except as explicitly defined above. Such plain and ordinary meaning is inclusive of all consistent dictionary definitions from the most recently published (on the filing date of this application) general purpose Webster's dictionaries and Random House dictionaries.

Referring to the drawing figures, these are only examples of the invention, and the invention is not limited to what is shown in the drawings.

FIGS. 1-6 show a cross section of a steel making furnace 10, in this example an electric arc steel making furnace with electrodes, such as electrode 11. Other steel making furnaces may also be used. The inside 12 of the furnace contains molten steel 13 with slag 14 on top of the steel. Taphole 15 is shown for draining steel 13 from the furnace, typically into a container such as ladle 16. Optionally, hydraulic actuator 17 may be provided to tilt or incline the furnace, so as to increase the depth or head H (see FIG. 2) of the molten steel at taphole 15. A source 21 of foaming agent provides particulate foaming agent 20 being provided on the inside 12 of the furnace into the slag and/or steel. Note that while FIG. 1 illustrates an eccentric taphole 15, any such furnace arrangement may be used, including without limitation concentric tapholes or otherwise.

Figure 2:
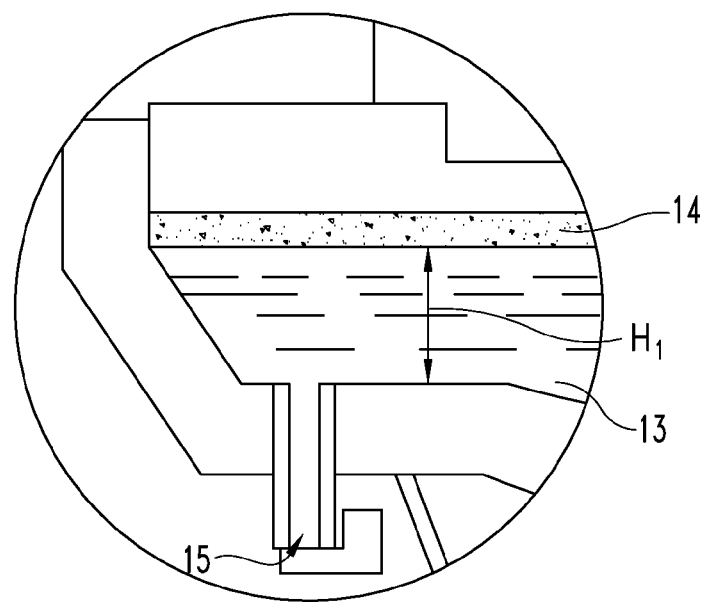
FIG. 2 is a detail of FIG. 1 shown at circle 2.

FIG. 2 is a detail of FIG. 1 at circle 2 before tap has been opened. In this case, the head $H_1$ of the steel 13 is illustrated.

Figure 3:
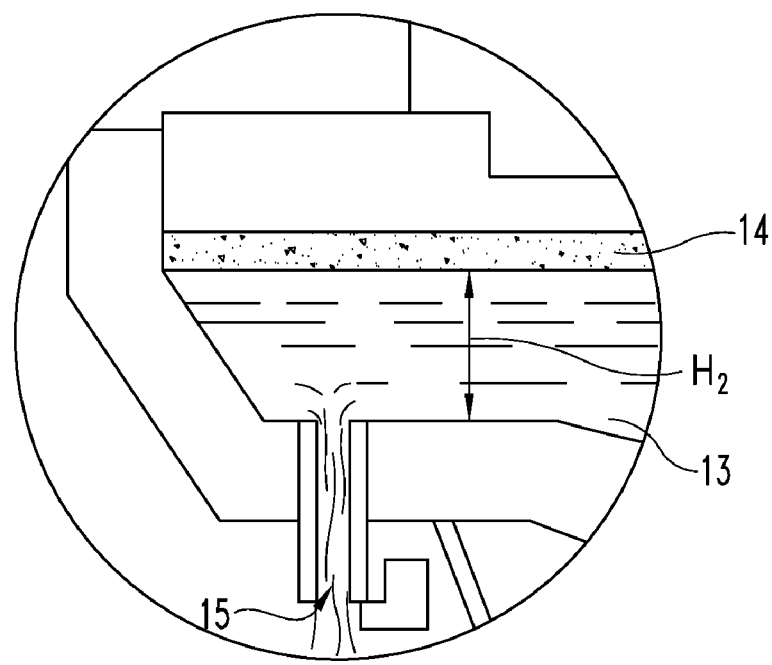
FIG. 3 is a detail like FIG. 2 showing steel being tapped from the furnace.

In FIG. 3, taphole 15 is open and molten steel is shown flowing through the taphole. The head $H_2$ is slightly less as compared to head $H_1$ of FIG. 2, due to the draining of steel through the taphole. As illustrated in FIG. 3, this is prior to initial vortex formation. Particles 20, while not shown in FIG. 3, never-the-less may optionally be added at this point in time to foam the slag.

Figure 4:
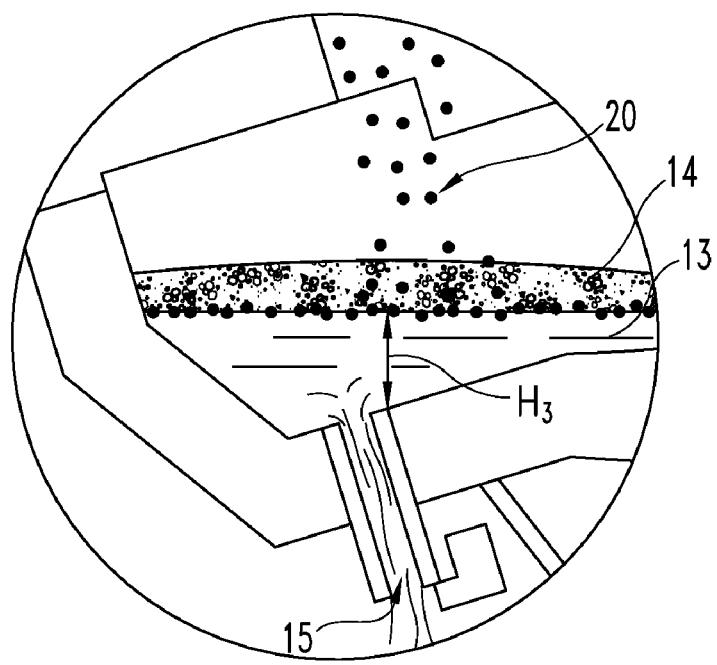
FIG. 4 is a detail like FIG. 3, inclined, showing the addition of particulate.
Figure 5:
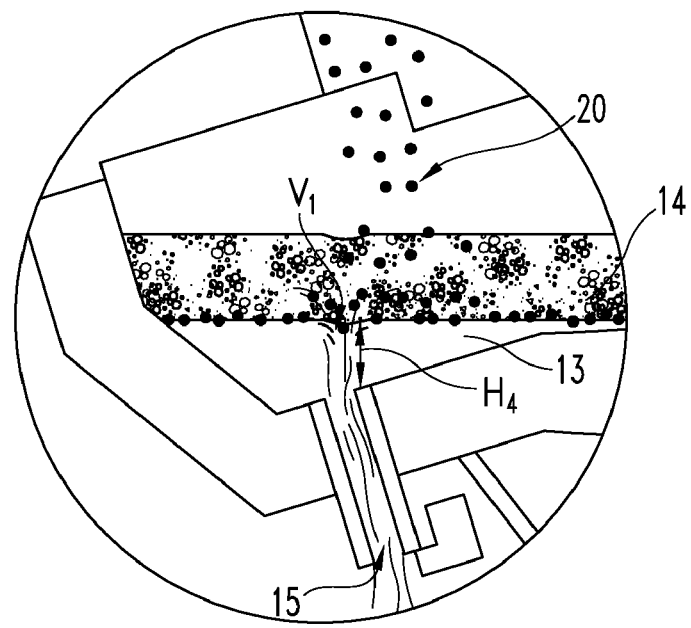
FIG. 5 is a detail like FIG. 4, showing initial formation of a vortex during tapping.
Figure 6:
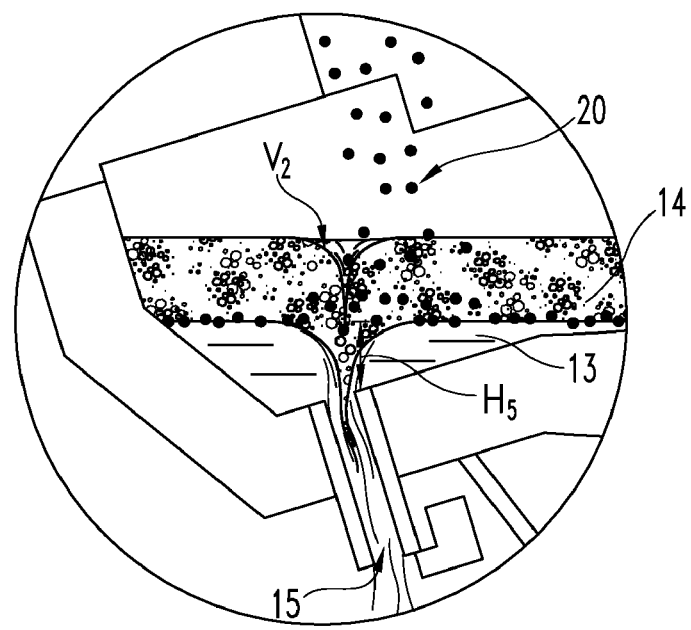
FIG. 6 is a detail like FIG. 4, showing a vortex during tapping.

Note that in FIGS. 4, 5 and 6, the liquid level of the steel 13 and slag 14 are tilted to reflect the (optional) tilting caused by actuator 17 (see FIG. 1) during tapping. Particles 20 of foaming agent are shown for illustration purposes. This may be added at the FIG. 1 stage or later or both. The particles 20 may be added by hopper, lance injector, being thrown in mechanically or manually, or otherwise.

In FIG. 4, the head $H_3$ may be initially increased, as compared to head $H_2$ of FIG. 3, due to the tilting of the furnace. However, in FIG. 4, the head $H_3$ is illustrated as less than $H_2$ of FIG. 3, despite the optional tilting, reflecting that FIG. 4 illustrates the steel after both tilting and tapping more steel from the furnace. Note that head $H_3$ is likewise oriented vertical with respect to gravity. Note further that FIG. 4 illustrates the steel before initial vortex formation. Note further that particulate 20 is dropped or otherwise added or injected into the furnace, preferably near the taphole 15. The term "near" is as defined. However, as one non-limiting example, typically the particulate is added (in whole or in part) within about one meter (horizontal radius) above the location over the taphole, although this may be more or less. As illustrated in FIG. 4, preferably, although optionally, the particles 20 are or contain a foaming agent and have a density that is close to or greater than slag 14, at least after it is foamed, but less than steel 13. Upon entry into the slag, the particles react, producing a gas, such as for example, CO gas, causing the slag to foam. The foaming action further entrains the particles into the slag and promotes more rapid and continued foaming action. Optionally, but preferably, such particles 20 are added to the furnace after more than half of the total volume of steel 13 has been drained from the furnace through tap hole 15. Preferably, they occur however, at or shortly before initial vortex formation. As illustrated, particles 20 react in the furnace and liberate gas, and foam the slag. This results in a reduced slag density, and is illustrated by the thicker depth of slag in FIGS. 4-6.

FIG. 5 shows tapping after vortex $V_1$ is being initially formed. At this point, head $H_4$ is less than head $H_3$. Although the formation of vortex $V_1$ was delayed (e.g. interrupted from FIG. 4 to FIG. 5) by the foaming caused by particles 20, allowing the greater quantity of purer steel to be tapped, eventually vortex $V_2$ is formed in the typical situation, as illustrated in FIG. 6. With the foaming agent foaming slag, it will reduce the slag density, particularly near the taphole 15. As such, to the extent that some of such post-vortex slag is drawn down through the taphole with the vortex of steel, (see FIG. 6), its density is reduced and therefore the total mass of slag drawn through the taphole is reduced before the tapping operation is stopped. For example, the tapping operation may be stopped by tilting the furnace back to its original, horizontal position by moving an actuator, such as actuator 17 (see FIG. 1). This may leave a heel of steel, as well as retained slag, in the furnace. As such, just prior to stopping the tapping process, with the foaming of the slag at this tapping point in the process, less slag mass tends to be received in ladle 16. Preferably, the foaming agent is one that does not alloy easily with steel. Also, preferably, when an exothermic agent such as calcium carbide is used in particulate 20, this tends to maintain a liquid slag for a longer period and provides for a greater opportunity for oxide reduction and hence foaming. Since CaO is a primary product of the calcium carbide reduction reaction, this optional approach increases (locally) the basisity of the slag promoting a more stable foam. Additionally, should the foamed slag become entrained into the steel ladle, the CaO produced by the reduction reaction can be used as a supplement and/or replacement for CaO that (in the prior art) has been added as a component of added ladle fluxes.

Figure 7:
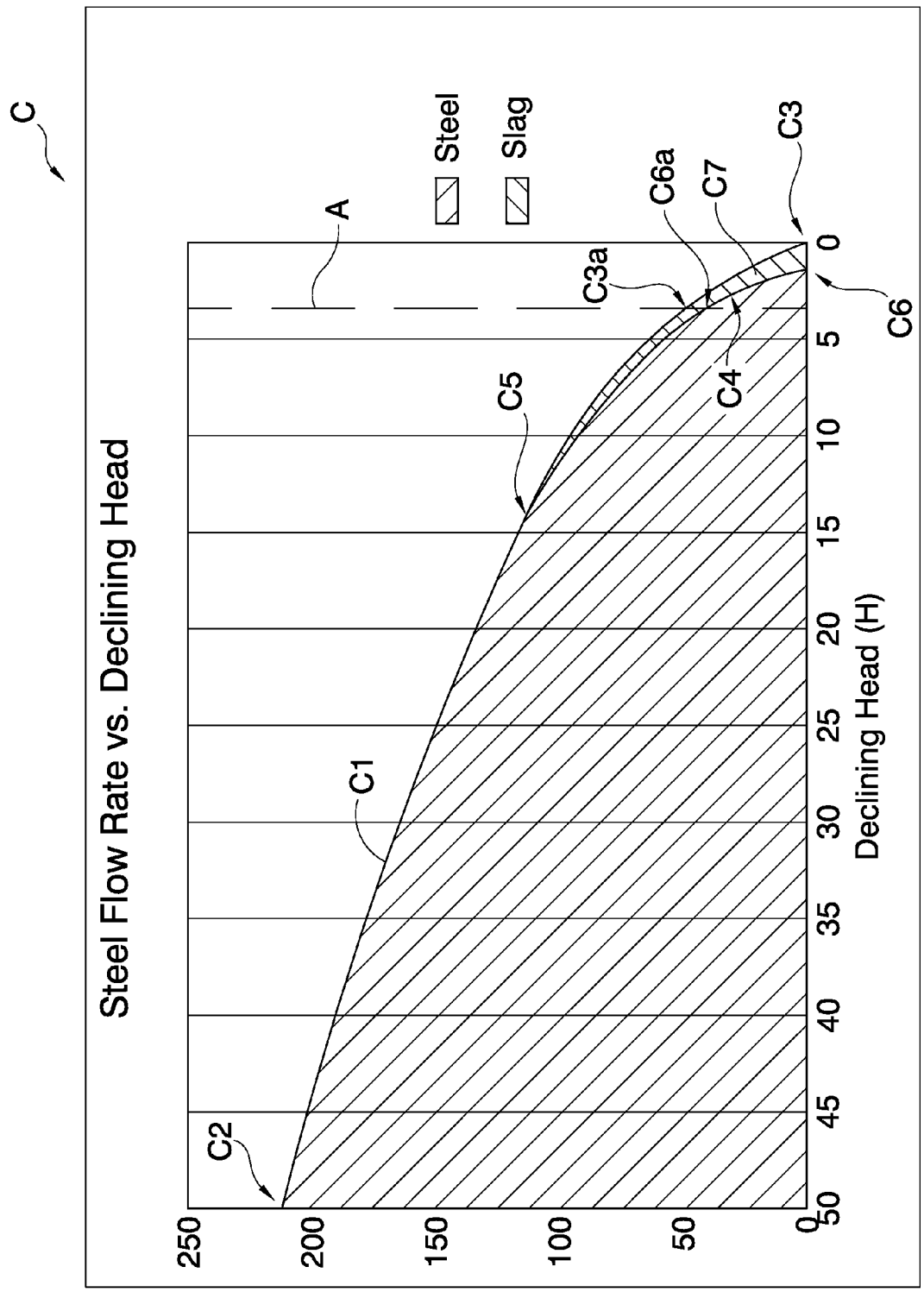
FIG. 7 is a chart (not to scale; abstract values) plotting theoretical steel flow rate through a taphole as a function of the head of molten steel in the furnace.

FIG. 7 shows chart C of steel flow rate (shown as the vertical Y-axis on chart C) versus declining head (X-axis), in a theoretical, non-tested illustration. Note that such curve C1 showing head in theory would need to be shifted to reflect the weight of slag 14 floating on top of the steel 13, regardless of the density of such slag. This is not illustrated in FIG. 7 for simplicity. As such, as head approaches zero (0), the flow rate tends to decelerate in a non-linear function as shown by curve C1 running from point C2 to point C3 at which there is zero head and zero flow rate. In this theoretical curve C1, vortex formation occurs at some point depending on a number of variables, that point being shown as point C5. It is believed that the mechanics of vortex formation are quite complicated, and vary on a number of parameters including furnace geometry, taphole diameter and shape, head depth, viscosity, liquid velocity, and otherwise. However, in the formation of a vortex, such as water through a bathtub drain, due to the physical presence of the vortex, part of the cross-sectional area of the drain, or in this case, the taphole, is occupied by liquid flow, whereas the central region tends to be occupied by flow of something else, namely air or other gas or other substance. As such, in a bathtub drain with water, and in a steel furnace with molten steel, the flow rate of steel is theorized herein to decay in an even faster curve than C1, as illustrated instead by curve segment C4 running from point C5 to point C6. The area between curves C1 and C4 is illustrated as area C7. This is believed to signify (not to scale) the volume of other substance, in this case primarily slag, which may be drained through the tap. It is believed that by adding the particulate 20 or other foaming agent, and its tendency to liberate gas in a foaming gaseous slag at the claimed points in time, there are at least one, and optionally two potential beneficial effects. The first is that when added prior to initial vortex formation, such initial vortex formation is delayed. Namely as illustrated in chart C of FIG. 7, the location of vortex formation point C5 may be pushed further down the curve C1 in a direction toward zero to provide for a reduction of slag mass draining from the taphole since the appearance of area C7 will be deferred. Secondly, because of the foaming nature of the slag, the foaming slag has less density than non-foamed slag. The density may vary, and may optionally be as high as about 80% gas and 20% slag, but greater or lesser amounts of gas are also possible. As such, while the volume of slag represented by area C7 may remain approximately the same (albeit potentially partially compressible due to its foamy nature including compressible gas therein), but nevertheless due to such lower density, the actual mass of slag that actually goes through the taphole is reduced, even if the taphole were not shut while part of the steel/slag combination, including area C7 were allowed to drain through the taphole.

As mentioned, the tapping process typically is stopped before all of the steel and/or slag is tapped from the furnace. This is reflected in vertical dashed line A in FIG. 7. There, steel and slag to the right of line A is the steel heel and retained slag. Normally, these may be carried over (in whole or in part) to the next process cycle. Thus, in this situation the previous description of FIG. 7 is apt, except truncating the chart at line A, and thereby otherwise replacing in the description of the curves and areas: C3a for C3, C6a for C6, and area C7 would only comprise that subset of such area to the left of line A.

While the vortex mechanics are not fully understood in the hot environment of a steel furnace, it is theorized that the vortex formation is more likely to occur towards the end of tapping corresponding to the lower flow rate as the head is near its minimum. Also, while these mechanics are not fully understood, it is theorized that the formation of bubbling and their agitational movement upwards in the steel and/or more typically in the slag, form localized flow patterns therein, which are in different directions than the downward spiral tending towards vortex formation. As such, such action is thought to disrupt, and hence delay initial vortex formation.

Note that as part of this, particles 20 or other foaming agent may be added even after initial vortex formation, such as illustrated in FIGS. 5 and/or 6. While it is unclear whether such late addition could reverse vortex formation to eliminate or weaken the vortex, nevertheless it is still believed to provide the beneficial effect of reducing slag density, and therefore reducing slag mass from draining through the taphole. Preferably, the addition of particles 20, whether before initial vortex formation, after initial vortex formation, or both occurs for a sustained period. Part of this takes into account the particle size and surface area of the foaming additive. Smaller particles tend to react faster in the slag/steel, liberating gas faster, but also being consumed faster. Since it is preferable to maintain the foaming action, both prior to initial vortex formation, as well as throughout the remainder of the tapping operation (including optionally beginning adding from point C5 (or somewhat left of C5) to point C3, C3a, C6 and/or C6a on the curve of FIG. 7), sustained foaming is preferred. This may be done by continuous or semi-continuous addition of particles 20, adding them in more than one groups, and/or both. Moreover, they may be added with a variety of particle sizes, the smaller ones facilitating more rapid gas evolution to help promote mechanical disruption, with the larger particles (albeit still smaller than taphole 15) providing more sustained gaseous foaming of the slag.

Applicant notes that if some of particles 20 or other foaming agent are not fully reacted/dissolved in the steel/slag, and pass through taphole 15 into the ladle before tapping is stopped, this tends to not have a detrimental effect. Rather, this simply would qualify as a post-tapping ladle additive, such as white slag ladle practice, known in the steel making ladle art. For example, such residual particles in the ladle may contribute to conditioning of the ladle slag and help promote improved desulfurization of the steel in the ladle 16.

Optionally, the above described invention may be used in a steel making vessel other than a steel making furnace. For example, such vessel could include ladles, tundishes, and/or otherwise having a taphole at or near the bottom thereof.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A process for reducing the mass of slag from exiting a taphole in a steel making furnace, comprising the acts of:
   Charging a steel making furnace;
   Heating the contents of said furnace to form molten steel and slag on top of said steel;
   Tapping said steel through a taphole to drain said molten steel from said furnace;
   During said act of tapping, adding a foaming agent in the form of multiple particles into said slag in the furnace to form gaseous slag foam, wherein said particles are smaller than said taphole, wherein said foaming agent foams said slag providing for a reduction in the slag mass exiting through said taphole;
   wherein said foaming agent is added prior to vortex formation and wherein gas bubbles formed by said agent disrupts vortex formation at said taphole.

2. The process of claim 1 wherein said foaming agent comprises an exothermic, slag conditioner that substantially does not alloy with steel.

3. The process of claim 2 wherein said foaming agent includes a steel desulfurizing agent.

4. The process of claim 3 wherein said foaming agent includes calcium carbide.

5. The process of claim 1 wherein at least some of said foaming agent particles are added near said taphole.

6. The process of claim 5 wherein at least some of said foaming agent particles are added after initial vortex formation.

7. The process of claim 6 wherein said particulate is added after at least half of the molten steel is tapped from said furnace, and wherein said foaming agent is added to provide a sustained foaming action in the slag during tapping to substantially reduce the density of slag near said taphole.

8. The process of claim 7 wherein said particulate has a density that is greater than the foamed slag and is less than the steel in the furnace.

9. The process of claim 8 wherein a foaming assistor is added with said foaming agents to enhance the ability of the slag to foam.

10. The process of claim 8 wherein a foaming assistor is added with said foaming agents to enhance the ability of the slag to foam.

11. The process of claim 1 wherein said foaming agent includes a steel desulfurizing agent.

12. The process of claim 1 wherein said foaming agent includes calcium carbide.

13. The process of claim 1 wherein at least some of said foaming agent particles are added near said taphole.

14. The process of claim 1 wherein at least some of said foaming agent particles are added after initial vortex formation.

15. The process of claim 1 wherein said particulate is added after at least half of the molten steel is tapped from said furnace, and wherein said foaming agent is added to provide a sustained foaming action in the slag during tapping to substantially reduce the density of slag near said taphole.

16. The process of claim 1 wherein said particulate has a density that is greater than the foamed slag and is less than the steel in the furnace.

17. The process of claim 2 wherein said foaming agent is added prior to vortex formation and wherein gas bubbles formed by said agent disrupts vortex formation at said taphole.

18. The process of claim 2 wherein said particulate is added after at least half of the molten steel is tapped from said furnace, and wherein said foaming agent is added to provide a sustained foaming action in the slag during tapping to substantially reduce the density of slag near said taphole.

19. The process of claim 12 wherein said particulate is added after at least half of the molten steel is tapped from said furnace, and wherein said foaming agent is added to provide a sustained foaming action in the slag during tapping to substantially reduce the density of slag near said taphole.

20. The process of claim 12 wherein said foaming agent is added prior to vortex formation and wherein said slag foam formed by said agent disrupts vortex formation at said taphole.

21. A process for reducing the mass of slag from exiting a taphole in a steel making furnace, comprising the acts of:
    Charging a steel making furnace;
    Heating the contents of said furnace to form molten steel and slag on top of said steel;
    Tapping said steel through a taphole to drain said molten steel from said furnace;
    During said act of tapping, adding calcium carbide into said slag in the furnace to form gaseous slag foam, wherein said calcium carbide foams said slag providing for a reduction in the slag mass exiting said taphole;
    wherein said calcium carbide is added prior to vortex formation and wherein gas bubbles formed by said agent disrupts vortex formation at said taphole.

22. The process of claim 21 wherein said calcium carbide is added after at least half of the molten; steel is tapped from said furnace.

23. The process of claim 21 wherein said calcium carbide provides a sustained foaming action in the slag during tapping to substantially reduce the density of slag near said taphole.

24. The process of claim 21 wherein said calcium carbide provides a sustained foaming action in the slag during tapping to substantially reduce the density of slag near the taphole.

25. The process of claim 22 wherein at least some of said foaming agent particles are added after initial vortex formation.

26. The process of claim 23 wherein at least some of said foaming agent particles are added after initial vortex formation.

27. The process of claim 21 wherein a foaming assistor is added with said calcium carbide to enhance the ability of the slag to foam.

* * * * *

UNITED STATES PATENT AND TRADEMARK OFFICE
CERTIFICATE OF CORRECTION

| | | |
|---|---|---|
| PATENT NO. | : 7,914,602 B1 | Page 1 of 1 |
| APPLICATION NO. | : 12/629426 | |
| DATED | : March 29, 2011 | |
| INVENTOR(S) | : Stewart W. Robinson | |

It is certified that error appears in the above-identified patent and that said Letters Patent is hereby corrected as shown below:

Column 3, line 20, delete "an".

Column 3, line 43, delete "a".

Signed and Sealed this
Thirty-first Day of May, 2011

David J. Kappos
*Director of the United States Patent and Trademark Office*